United States Patent
Crawford et al.

(10) Patent No.: US 9,926,884 B2
(45) Date of Patent: Mar. 27, 2018

(54) SLAT-THRUST REVERSER CLEARANCE (71) Applicant: ROHR, INC., Chula Vista, CA (US)

(72) Inventors: Sara Christine Crawford, San Diego, CA (US); Michael Aten, San Diego, CA (US); Anthony Lacko, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 288 days.

(21) Appl. No.: 14/626,800

(22) Filed: Feb. 19, 2015

(65) Prior Publication Data
US 2016/0245227 A1  Aug. 25, 2016

(51) Int. Cl.
*F02K 1/54* (2006.01)
*F02K 1/72* (2006.01)
*B64D 29/02* (2006.01)
*F02K 1/82* (2006.01)
*B64D 33/04* (2006.01)

(52) U.S. Cl.
CPC ........... *F02K 1/54* (2013.01); *B64D 29/02* (2013.01); *B64D 33/04* (2013.01); *F02K 1/72* (2013.01); *F02K 1/82* (2013.01); *F05D 2260/50* (2013.01)

(58) Field of Classification Search
CPC ........ B64D 27/12; B64D 29/02; B64D 29/06; B64D 33/04; F05D 2260/30; F02K 1/72; F02K 1/766; F02K 1/54; F02K 1/625; F02K 1/70; F02K 1/80
See application file for complete search history.

(56) References Cited

U.S. PATENT DOCUMENTS 4,030,291 A * 6/1977 Sargisson ............... F02K 1/70
239/265.29
2013/0280052 A1  10/2013 Gonidec et al.

FOREIGN PATENT DOCUMENTS

| EP | 2620627 | 7/2013 |
| WO | 2014052061 | 4/2014 |
| WO | 2014052281 | 4/2014 |
| WO | 2016001587 | 1/2016 |

OTHER PUBLICATIONS

Extended European Search Report dated Jul. 14, 2016 in European Application No. 16156173.3.

* cited by examiner

*Primary Examiner* — Andrew Nguyen
(74) *Attorney, Agent, or Firm* — Snell & Wilmer L.L.P.

(57) ABSTRACT

A nacelle is provided comprising, a thrust reverser comprising a translating sleeve configured to translate between a stowed position and a deployed position, the translating sleeve comprising a slat cutout for clearance, and a slat door disposed at least partially in the slat cutout in response to the thrust reverser being in the stowed position, wherein the slat door is configured to move in response to the thrust reverser being in the deployed position to expose a portion of the slat cutout to accept a portion of a deployed forward wing slat.

7 Claims, 8 Drawing Sheets

SLAT-THRUST REVERSER CLEARANCE

FIELD

The present disclosure relates to thrust reverser systems and, more specifically, to the relative spacing between a thrust reverser and a wing without possibility of a clash.

BACKGROUND

Gas turbine engine propulsion systems for modern aircraft often include an under-wing mounted engine and nacelle including a thrust reverser. The thrust reverser selectively redirects the flow of air from the fan duct through the nacelle in order to apply a reverse thrust to the aircraft, which is used during landing to slow or backup the aircraft. One style of thrust reverser includes a translating sleeve. The translating sleeve translates aft to deploy blocker doors into the bypass air duct of a nacelle. The blocker doors redirect air in the bypass air duct outward though a series of cascades which then turn the air in a pattern, primarily forward, producing reverse thrust.

In cases where the moving parts of the thrust reverser, including the translating sleeve, should not contact, during aircraft operation, any portion of the wing to which the thrust reverser is relatively closely positioned. In the aircraft's design, where the spacing between the thrust reverser and the wing is set to ensure there is no unintentional contact. However, close spacing of the thrust reverser and propulsion system to the wing can be important for optimizing various design goals, thus, there is an incentive to spacing the two as close together as possible while still eliminating all clashes. Recently, there has been interest in increasing a nacelle's bypass ratio, which is the ratio of air that travels through the bypass duct to the total air taken into a nacelle inlet. Higher bypass ratio engines usually result in larger diameter propulsion systems, which make the problem of packaging the propulsion system relative to the wing more acute. If a high bypass ratio propulsion system cannot be positioned relatively close to the wing, then the space required to accommodate its larger diameter will require taller and heavier landing gear to hold the aircraft higher off the ground (among other negative design consequences). Thus, there is a need for a thrust reverser design that facilitates close positioning of the propulsion system to the wing while still eliminating any unintentional aircraft wing slat-nacelle contact.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A nacelle is provided comprising a thrust reverser comprising a translating sleeve configured to translate between a stowed position and a deployed position, the translating sleeve comprising a slat cutout formed therein, and a slat clearance door disposed at least partially covering the slat cutout when the translating sleeve is in the stowed position, the slat clearance door creating a generally continuous, smooth aerodynamic surface over the slat clearance door relative to the translating sleeve, wherein the slat clearance door is configured to move in response to the thrust reverser being moved to the deployed position to expose a portion of the slat cutout to receive a portion of an aircraft wing slat.

A method is provided comprising, translating a translating sleeve of a thrust reverser of a nacelle to a deployed position from a stowed position, the translating sleeve comprising a slat cutout formed therein, moving a slat clearance door in response to the translating to expose a portion of the slat cutout to receive a portion of an aircraft wing slat.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of a gas turbine. As used herein, "forward" refers to the direction associated with the nose (e.g., the front end) of an aircraft, or generally, to the direction of flight or motion.

In various embodiments, a thrust reverser may comprise a translating sleeve. The translating sleeve may comprise a cutout. A slat clearance door may be disposed in the cutout when the thrust reverser is in a stowed position, as it would be, for example, in flight. In the deployed position, the slat clearance door and the translating sleeve may form a generally continuous, smooth aerodynamic surface. In that regard, air passing over the translating sleeve and slat clearance door may have minimum impacts to the aerodynamic characteristics as a translating sleeve without a slat clearance door. During deployment of the thrust reverser, the translating sleeve will translate aft. In response, the slat clearance door may move to expose the cutout. The cutout may then at least partially accept an aircraft wing or the deployed wing slat of the aircraft. The slat clearance door may move in any suitable manner, for example, in the manner described herein. The movement of the slat clearance door to expose the cutout avoids a clash between the translating sleeve and the wing slat.

Figure 1A:
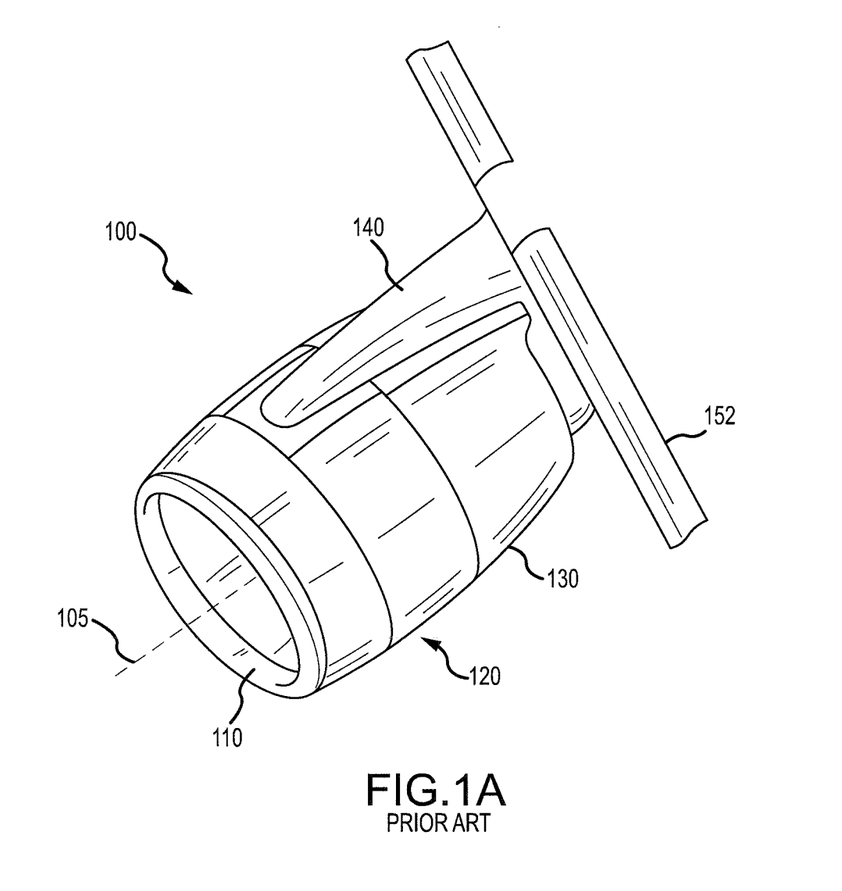
FIGS. 1A and 1B illustrate a perspective view of a prior art nacelle.
Figure 1B:
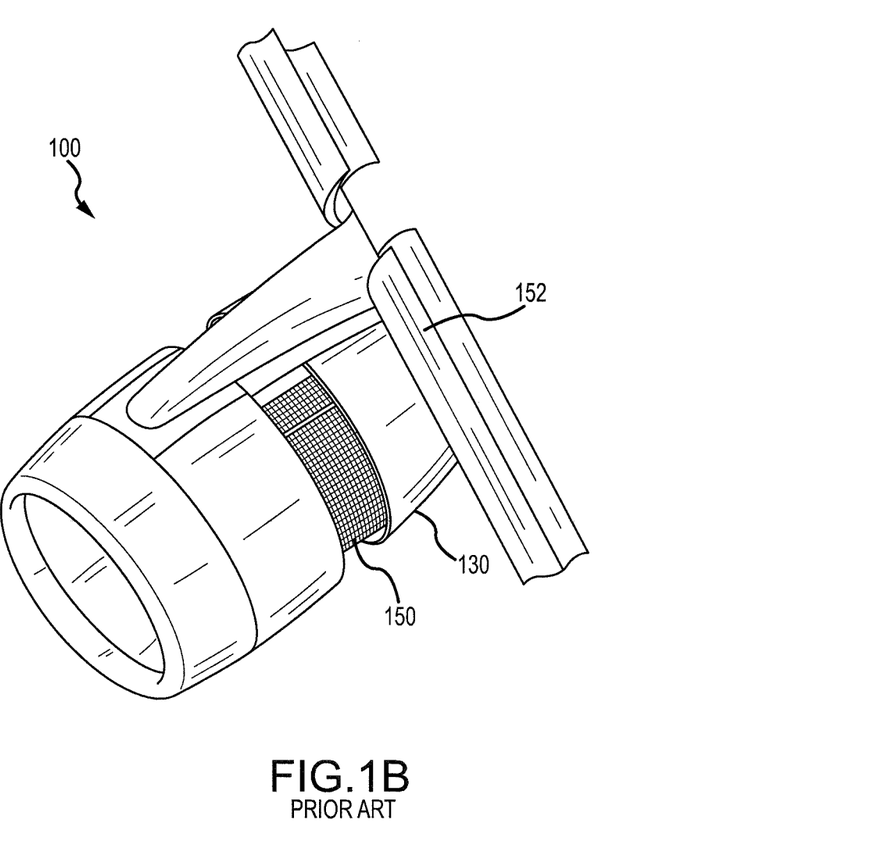

Referring to FIGS. 1A and 1B, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Inlet 110 is forward of thrust reverser 130. The thrust reverser 130 may comprise a cascade-type thrust reverser, in which bypass air is directed through a cascade, such as cascade 150, in order to apply a reverse thrust to an aircraft, such as during landing. The nacelle 100 may be generally disposed about a centerline 105, which may also be the axis of rotation of an engine located within the nacelle 100. Wing slat 152 is shown proximate to thrust reverser 130. In FIG. 1A, the thrust reverser 130 and the wing slat 152 are both shown in their respective stowed positions, and in FIG. 1B they are both shown in their respective deployed positions.

A thrust reverser for a nacelle may comprise a translating sleeve. The translating sleeve may comprise a line of action (its line of movement between its stowed position and its deployed position) that is parallel to a centerline of the nacelle. As previously described, when the translating sleeve moves along its line of action between its stowed and deployed positions, the aircraft design should ensure that there is never unintentional contact between the wing and the sleeve.

Figure 2A:
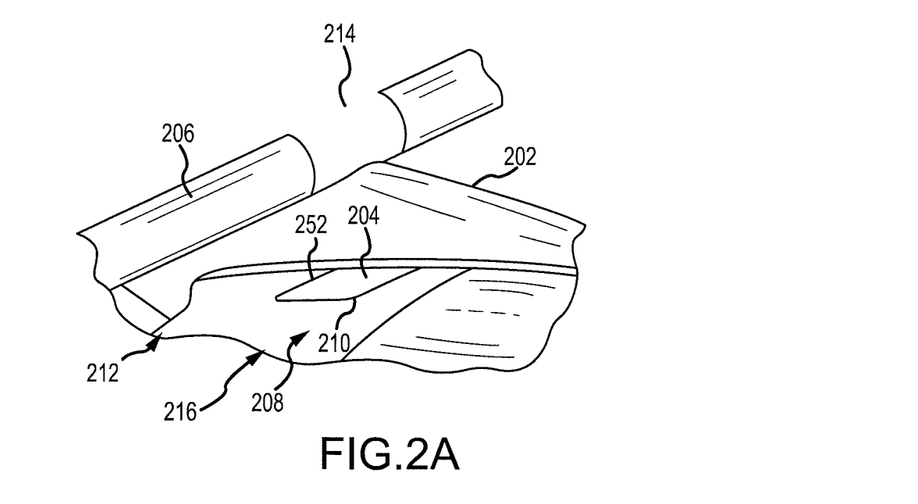
FIGS. 2A and 2B illustrate a perspective view of a nacelle in accordance with various embodiments.
Figure 2B:
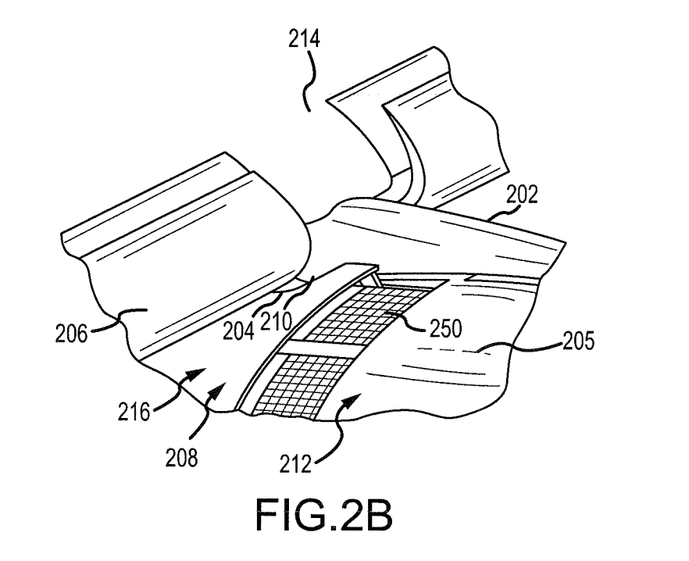

Referring to FIGS. 2A and 2B, nacelle 212 is mounted to aircraft wing 214 via pylon 202. Thrust reverser 216 is shown proximate pylon 202. Aircraft wing slat 206 is shown proximate translating sleeve 208. Aircraft wing slat 206 may be attached to aircraft wing 214 and may be configured to be in a stowed position (which would be the position assumed during cruise flight) and a deployed position. In the deployed position, aircraft wing slat 206 may rotate forward and downward towards nacelle 212. Aircraft wing slat 206 may take the deployed position during landing. Slat clearance door 204 is shown disposed at least partially in slat cutout 210. Translating sleeve 208 and thrust reverser 216 are in a stowed position in FIG. 2A, and in a deployed position in FIG. 2B. In the stowed position, slat clearance door 204 is flush or substantially flush with the outer aerodynamic surface of translating sleeve 208. Thus, the surface of slat clearance door 204 and translating sleeve 208 forms a smooth, continuous, outer aerodynamic surface. Aircraft wing slat 206 is not in contact with translating sleeve 208 when the translating sleeve is in its stowed position. However, when the translating sleeve 208 moves to its deployed position in FIG. 2B, and the aircraft wing slat 206 takes a deployed position, a portion of the aircraft wing slat 206 will be positioned inside of the slat cutout 210, and as will be more fully described with examples below, the slat clearance door will move to accommodate the forward deployed slat in this condition and avoid a clash.

FIG. 2A illustrates translating sleeve 208 and thrust reverser 216 in a stowed position. FIG. 2B illustrates translating sleeve 208 and thrust reverser 216 in a deployed position. With translating sleeve 208 in the deployed position, slat clearance door 204 is shown moved from a stowed to a deployed position. In its deployed position, the slat clearance door 204 exposes the underlying slat cutout 210 so that if aircraft wing slat 206 is in a deployed position, it can be positioned at least partially inside of the slat cutout 210. In its deployed position, cascade 250 is exposed.

As depicted in FIGS. 2A and 2B, the slat clearance door 204 remains coupled to and translates along with the translating sleeve when it moves to its deployed position, but also pivots relative to translating sleeve 208 in order to expose the slat cutout 210. More particularly, the slat clearance door 204 is rotated generally radially inward with respect to centerline 105 (i.e., the centerline of nacelle 212). A hinge 252 may couple translating sleeve 208 to slat clearance door 204 and allows slat clearance door 204 to rotate radially inward with respect to centerline 105 during transition to the deployed position. In the deployed position, slat cutout 210 is brought in proximity to aircraft wing slat 206. Aircraft wing slat 206 may at least partially fill slat cutout 210 and, thus, slat cutout 210 prevents aircraft wing slat 206 from unintentionally contacting translating sleeve 208. Hinge 252 also allows slat clearance door 204 to rotate radially outward with respect to centerline 105 during transition of translating sleeve 208 to the stowed position. Translating sleeve 208 may contain a translating mechanism containing various actuators and/or linkages to drive translating sleeve 208 aft to reach its deployed position and forward to reach its stowed position, in a known manner. This movement of the translating sleeve 208 may be used to drive the movement of slat clearance door 204, as described below.

Figure 3A:
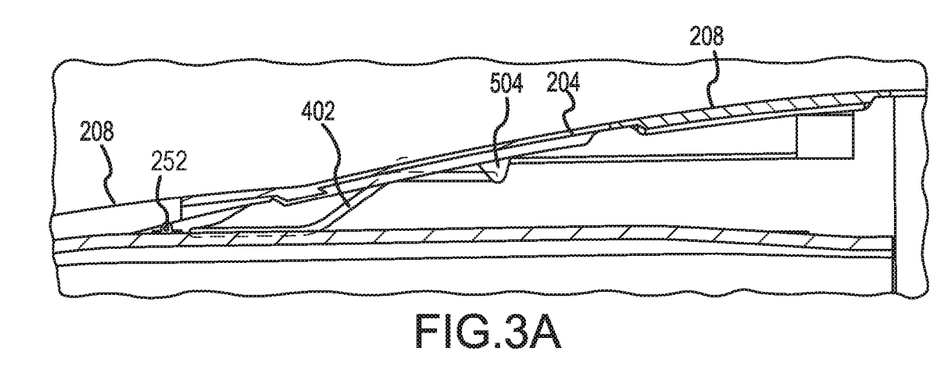
FIGS. 3A-3B a side view of a nacelle in accordance with various embodiments in a stowed position and a deployed position, respectively.
Figure 3B:
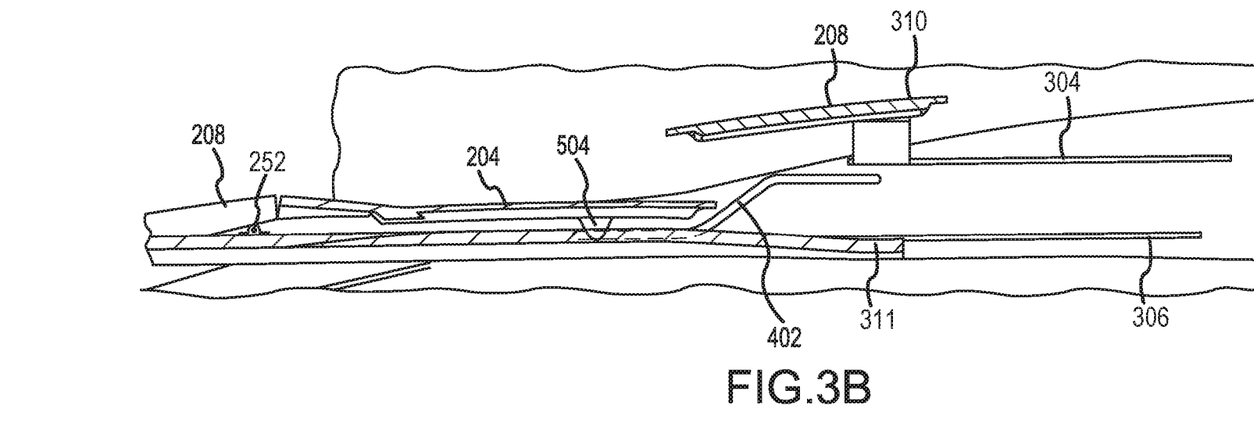

With reference to FIGS. 3A and 3B, thrust reverser system 200 is shown in a cross section view. FIG. 3A illustrates translating sleeve 208 and thrust reverser 216 in a stowed position. FIG. 3B illustrates translating sleeve 208 and thus thrust reverser 216 in a deployed position. Track 402 is mounted to a hinge beam, the hinge beam, in turn, may be mounted to the pylon 202. Pin 504 is shown on a forward portion of slat clearance door 204. A first portion of pin 504 is disposed in track 402 and second portion of pin 504 is coupled to slat clearance door 204. Though only one pin 504 is shown, it is understood that one or more pins may be coupled to slat clearance door 204 and disposed in track 402.

In FIG. 3A, pin 504 is shown in a forward portion of track 402. As translating sleeve 208 translates aft to reach the deployed state, pin 504 is guided by track 402 and, accordingly, slat clearance door 204 is also guided by track 402. Track 402 thus guides slat clearance door 204 in rotation with respect to translating sleeve 208. During translation, slat clearance door 204 pivots about hinge 252. In FIG. 3B, pin 504 is shown in an aft portion of track 402. FIG. 3B illustrates panel (also referred to herein as an outer panel) 310 of translating sleeve 208 slideably mounted to track (also referred to herein as a second track) 304. FIG. 3B illustrates panel (also referred to herein as an inner panel) 311 of translating sleeve 208 slideably mounted to track (also referred to herein as a third track) 306.

In various embodiments, a slat door may not translate with respect to a translating sleeve but instead rotate with respect to a hinge beam in response to translation of a translating sleeve. Thus, the rotation with respect to a hinge beam may allow a slat door to be at least partially removed from a slat cutout, thus allowing an aircraft wing slat to move to be at least partially into a slat cutout.

Figure 4A:
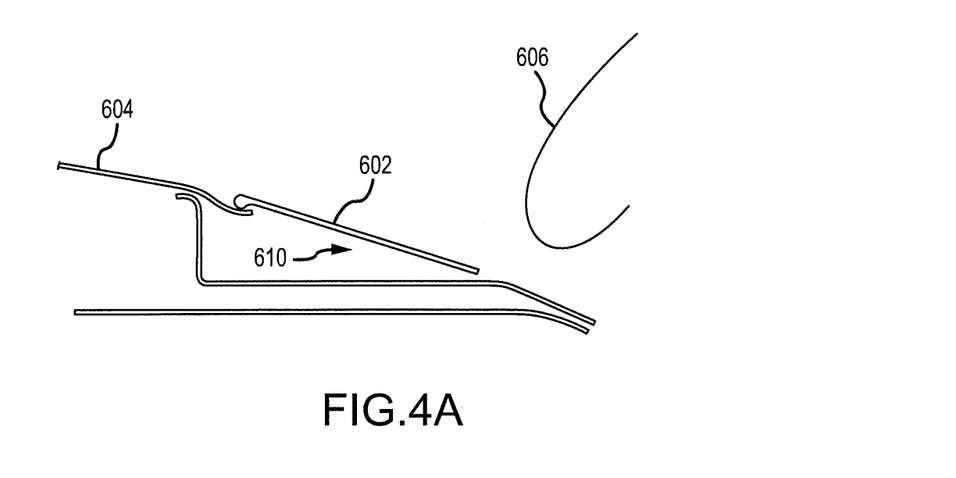
FIG. 4A-4B illustrate a side view of a nacelle in accordance with various embodiments in a stowed position and a deployed position, respectively.

With reference to FIG. 4A, translating sleeve 604 is shown in the stowed position. Translating sleeve 604 is shown having slat clearance door 602 at least partially disposed in slat cutout 610. In that regard, slat clearance door 602 is flush or substantially flush with the outer aerodynamic surface of translating sleeve 604. Thus, the surface of slat clearance door 602 and translating sleeve 604 forms a smooth, continuous, outer aerodynamic surface. Aircraft wing slat 606 is shown in proximity to slat clearance door 602, aircraft wing slat 606 being in its stowed position that it may take during cruise flight. Slat clearance door 602 may be coupled to the hinge beam 710 via hinge 704. Slat clearance door 602 may remain in contact with translating sleeve 604. In various embodiments, hinge 704 may include a torsion spring biased to rotate slat clearance door 602 radially outward with respect to centerline 105. In various embodiments, any device may be configured to cause rotation of slat clearance door 602 radially outward with respect to centerline 105 about hinge line 704 against a biased torsion spring.

Figure 4B:
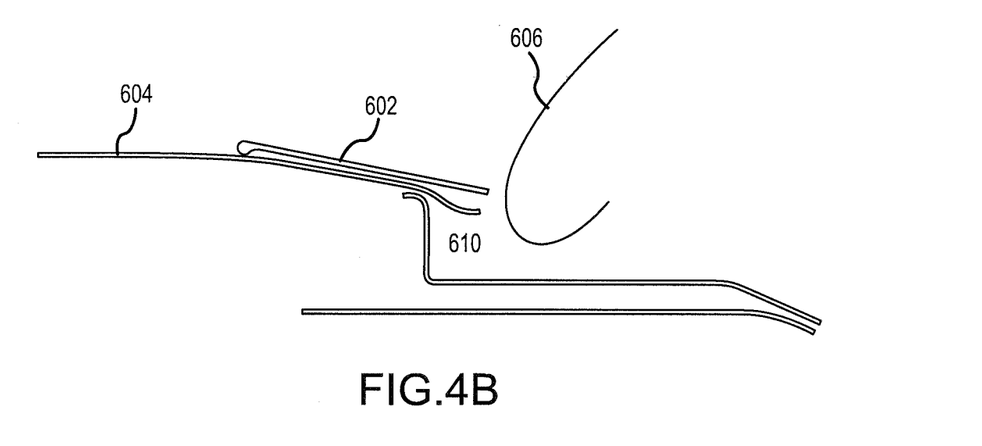

With reference to FIG. 4B, translating sleeve 604 is shown in the deployed position. Translating sleeve 604 is shown having slat clearance door 602 exposing slat cutout 610. Aircraft wing slat 606 is shown at least partially within slat cutout 610. Slat clearance door 602 is rotated radially outward from centerline 105, preventing unintentional contact between aircraft wing slat 606 and slat clearance door 602. During translation to the stowed position, slat clearance door 602 is rotated radially inward with respect to centerline 105, about hinge line 704 as driven by a biased torsion spring.

Figure 5:
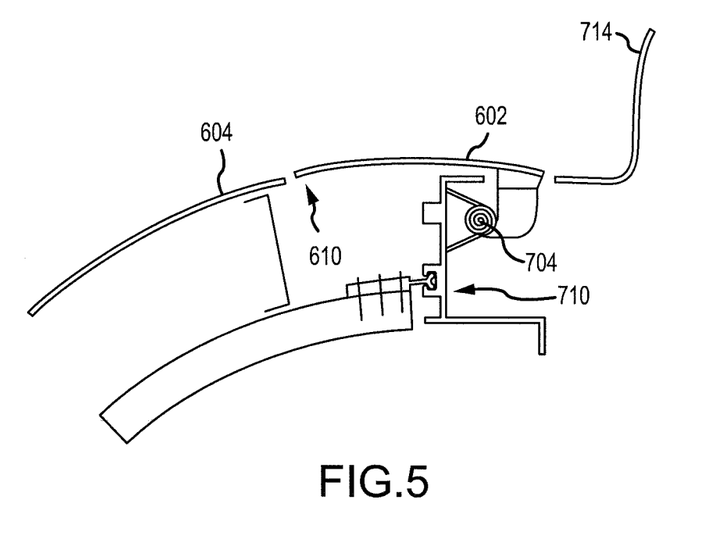
FIG. 5 illustrates an aft-forward view of a nacelle in accordance with various embodiments in a stowed position.

With reference to FIG. 5, translating sleeve 604 is shown in the stowed position. Translating sleeve 604 is shown having slat clearance door 602 at least partially disposed in slat cutout 610. An aircraft wing slat is in proximity to slat clearance door 602. Slat clearance door 602 may be coupled to hinge beam 710 via hinge 704. Hinge beam 710 is fixed to pylon 714. In various embodiments, hinge 704 may comprise a torsion spring biased to rotate slat clearance door 602 radially outward with respect to centerline 105.

Figure 6A:
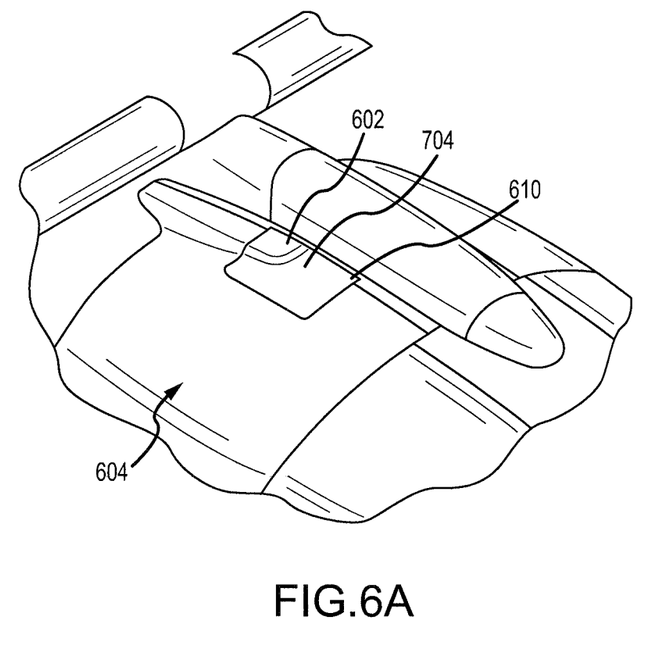
FIG. 6A illustrates a view of a nacelle in accordance with various embodiments in a stowed position.
Figure 6B:
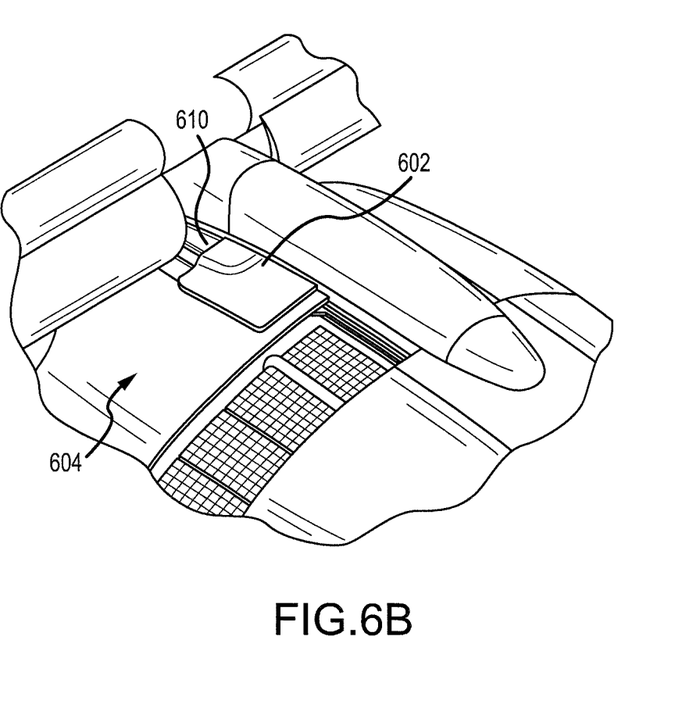
FIG. 6B illustrates a view of a nacelle in accordance with various embodiments in a deployed position.

With reference to FIGS. 6A and 6B, translating sleeve 604 is shown. Translating sleeve 604 is shown having slat clearance door 602 exposing slat cutout 610. Translating sleeve 604 is in a stowed position in FIG. 6A and in a deployed position in FIG. 6B. In FIG. 6B, translating sleeve 604 is shown having slat clearance door 602 moved outward radially exposing slat cutout 610.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:
1. A nacelle comprising:
a thrust reverser comprising a translating sleeve configured to translate between a stowed position and a deployed position, the translating sleeve comprising a slat cutout formed therein;
a hinge beam;
a first track mounted to the hinge beam; and
a slat clearance door disposed at least partially covering the slat cutout when the translating sleeve is in the stowed position, the slat clearance door creating a generally continuous, smooth aerodynamic surface over the slat clearance door relative to the translating sleeve; and
a pin, wherein a first portion of the pin is disposed in the first track and a second portion of the pin is coupled to the slat clearance door,
wherein the slat clearance door is configured to move in response to the thrust reverser being moved to the deployed position to expose a portion of the slat cutout to receive a portion of an aircraft wing slat,
wherein the slat clearance door comprises a forward edge, an aft edge, a first side edge extending between the forward edge and the aft edge, and a second side edge extending between the forward edge and the aft edge,
wherein the slat clearance door is coupled to the translating sleeve via a hinge, the hinge located along the aft edge of the slat clearance door, and wherein the first track is disposed radially inward of a second track to which an outer panel of the translating sleeve is slideably mounted.

2. The nacelle of claim 1, further comprising a pylon upon which the thrust reverser is mounted.

3. The nacelle of claim 1, wherein the pin is mounted in the first track.

4. The nacelle of claim 3, wherein the pin travels within the first track in response to being driven by the translating sleeve.

5. The nacelle of claim 4, wherein the slat clearance door is configured to rotate in a first direction in response to the thrust reverser moving to the stowed position, the first direction extending radially outward of a centerline of the nacelle.

6. The nacelle of claim 5, wherein the slat clearance door is configured to rotate about the hinge.

7. A method comprising:
translating a translating sleeve of a thrust reverser of a nacelle to a deployed position from a stowed position, the translating sleeve comprising a slat cutout formed therein;
moving a slat clearance door in response to the translating to expose a portion of the slat cutout to receive a portion of an aircraft wing slat, wherein a first track is mounted to a hinge beam and a first portion of a pin is disposed in the first track and a second portion of the pin is coupled to the slat clearance door; and
rotating the slat clearance door about a hinge, the hinge coupling the translating sleeve and an aft edge of the slat clearance door,
wherein the first track is disposed radially inward of a second track to which an outer panel of the translating sleeve is slideably mounted.

* * * * *